(12) United States Patent
Connors et al.

(10) Patent No.: US 9,096,264 B2
(45) Date of Patent: Aug. 4, 2015

(54) IMPLEMENT CARRIER WITH STEERABLE TRACKS

(71) Applicant: CNH America LLC, New Holland, PA (US)

(72) Inventors: Michael J. Connors, Lockport, IL (US); Marvin Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 108 days.

(21) Appl. No.: 13/804,180

(22) Filed: Mar. 14, 2013

(65) Prior Publication Data
US 2014/0262378 A1    Sep. 18, 2014

(51) Int. Cl.
*B62D 13/00* (2006.01)
*A01B 69/00* (2006.01)

(52) U.S. Cl.
CPC ............ *B62D 13/005* (2013.01); *A01B 69/003* (2013.01)

(58) Field of Classification Search
USPC .................. 172/278, 285, 286, 392; 180/6.2; 280/263
See application file for complete search history.

(56) References Cited

U.S. PATENT DOCUMENTS

| | | | |
|---|---|---|---|
| 3,789,942 A | 2/1974 | Kowalik | |
| 4,029,165 A | 6/1977 | Miller et al. | |
| 4,387,814 A | 6/1983 | Beduhn et al. | |
| 5,255,756 A * | 10/1993 | Follmer et al. | 180/401 |
| 5,590,977 A | 1/1997 | Guntert et al. | |
| 5,948,029 A | 9/1999 | Straetker | |
| 6,167,982 B1 | 1/2001 | Dillon | |
| 7,310,929 B2 * | 12/2007 | Dow et al. | 56/192 |
| 7,849,932 B2 * | 12/2010 | Friggstad et al. | 172/278 |
| 7,942,604 B2 | 5/2011 | Willis et al. | |
| 7,988,403 B2 * | 8/2011 | Ricketts | 414/505 |
| 8,428,831 B2 * | 4/2013 | Thompson et al. | 701/50 |
| 8,640,785 B2 * | 2/2014 | Diaz et al. | 172/278 |
| 8,818,652 B2 * | 8/2014 | Thompson et al. | 701/50 |
| 2011/0100656 A1 * | 5/2011 | Connors et al. | 172/278 |
| 2011/0112721 A1 | 5/2011 | Wang et al. | |
| 2011/0125371 A1 * | 5/2011 | Wang et al. | 701/42 |
| 2011/0180332 A1 | 7/2011 | Gilbert et al. | |
| 2012/0240546 A1 * | 9/2012 | Kormann | 56/344 |

FOREIGN PATENT DOCUMENTS

| | | |
|---|---|---|
| EP | 0030908 | 10/1984 |
| GB | 1085742 | 10/1967 |
| WO | 03026385 | 4/2003 |
| WO | 2011113124 | 9/2011 |

* cited by examiner

*Primary Examiner* — Gary Hartmann
(74) *Attorney, Agent, or Firm* — Rebecca L. Henkel

(57) ABSTRACT

An agricultural implement having a steering mechanism comprising a outer hitch, a main carriage connected to the outer hitch by a first pivoting connection, a steering system disposed on the main carriage and an endless track assembly connected to the main carriage by a second pivoting connection and to the steering system by a third pivoting connection. The pivoting connections enable the tracks to be actively steered and remain parallel to the surface over which the implement travels.

10 Claims, 10 Drawing Sheets

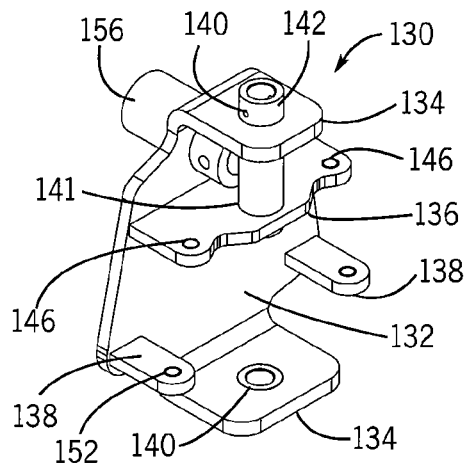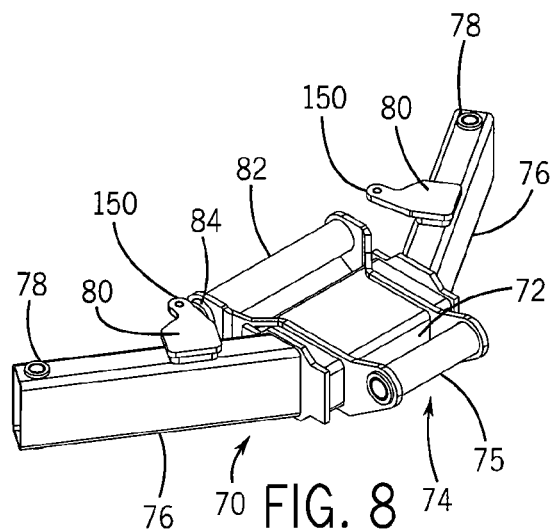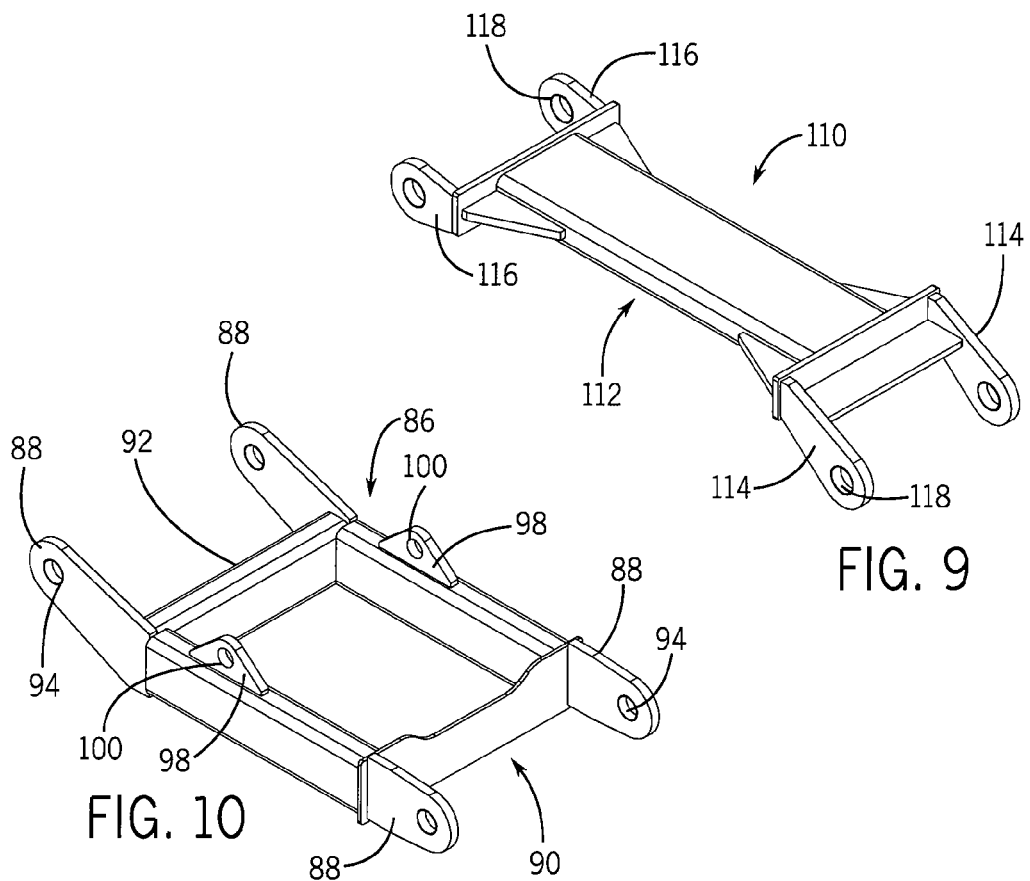

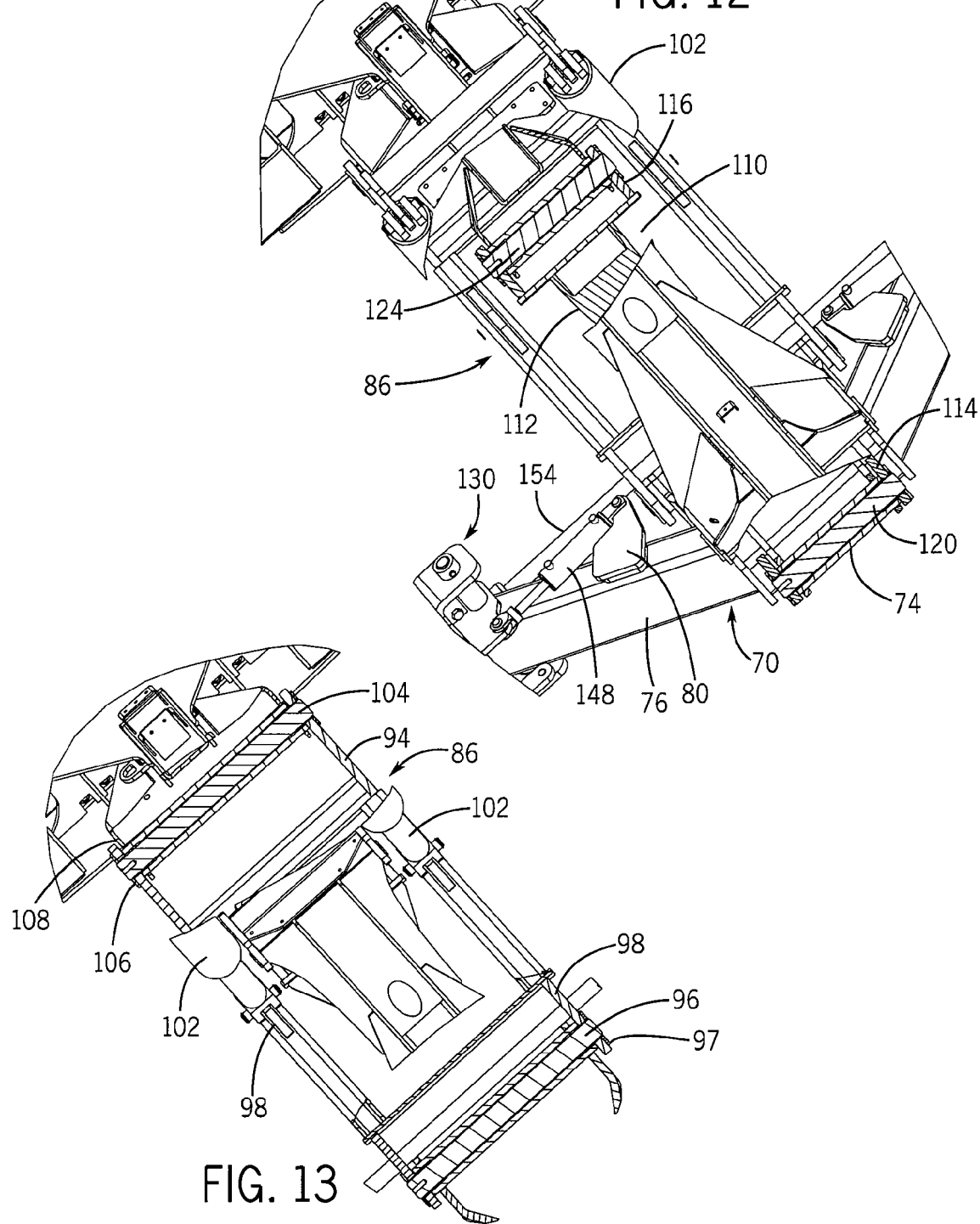

IMPLEMENT CARRIER WITH STEERABLE TRACKS

BACKGROUND OF THE INVENTION

The present invention relates generally to agricultural equipment and, more particularly, to an implement having a tracked, steerable main carrier that is towed by a tractor or other suitable vehicle.

Current planter sizes continue to grow in working width size, from the increase in the number of row units being requested by customers, to increases in on-board product containers, in order to be more productive. In addition, larger horsepower tractors are being used to tow the implement which results in heavy frame structures. All of these factors have a significant contribution to increased weight on the implement.

For example, prior art implements have a main carrier which can be equipped with four (4) high flotation tires. This carrier serves multiple functions. First, it carries the most highly loaded part of the implement weight, i.e. the outer hitch, product containers and inner connection points to the wing booms. Second, it serves as the lift mechanism responsible for raising and lowering the planter to the proper heights for field operation and road transport. Lastly, it can be equipped with a steering system which allows for increased maneuverability of the machine when folded into transport position. Currently, the tires utilized on implements of this type are capable of supporting the weight of the implement in order to allow the implement to be effectively used and transported.

Also, as implements become longer, road transport maneuverability becomes critical, thus the need for steering. In addition, the adoption rate of vehicle guidance system has become quite high. Customers are requesting the ability to also control the implement position while performing in-field work.

As planting is a time sensitive operation, customers do not always wait until field conditions are ideal for operation of the implement. As a result, while the wheels of the implements are capable of adequately supporting the weight of the implement on a dry surface, on a wet surface, the weight of the implement combined with the soil conditions leads to the wheels of the implements sinking in soft wet soils or loose soils and ultimately stopping the planting operation as the unit becomes "stuck". Customers are pressing manufactures for implements with the ability to have increased flotation on surfaces of this type.

To address the matter, prior art devices have been developed which replace the wheels with endless tracks. These types of tracks provide greater support for the implement on wet or loose soils, thereby lessening the potential for the implement becoming stuck.

However, when endless tracks are utilized on an implement, the connections between the tracks and the implement frame limit the ability of the implement to be steered in either the field and transport modes. This is due to the tracks becoming separated from the terrain during operation in either the field or transport mode, as well as during the transition between field and transport mode.

As a result, it is desirable to develop an implement employing an endless track motive system that overcomes the issues with prior art tracked implements.

SUMMARY OF THE INVENTION

The present disclosure is directed to an endless track system for a towable implement. The implement includes a number of pivoting connections that enable the tracks to be actively steered and remain parallel to the surface over which the implement travels. These pivoting connection include a first connection between the main carrier and the outer hitch, a second connection between the main carrier/steering structure and the outer hitch, a third connection between the steering structure and the track system, and a fourth connection between the drive tracks and the main carrier.

In accordance with one aspect of the invention, these pivoted connections between the track system and the outer hitch allow for improved crop yields due to reduction in soil compaction by the implement employing the track system of the present disclosure.

In accordance with another aspect of the present invention, the track system of the present disclosure provides means for in-field implement guidance or steering capability.

In accordance with still another aspect of the present invention, the track system of the present disclosure reduces the need for maintenance due to crop stubble and road hazards as a result of the structure of the endless tracks.

In accordance with still a further aspect of the present disclosure, the track system of the present disclosure provides improved implement and machine stability due to use of endless tracks on the implement.

According to still another aspect of the present invention, the track system of the present disclosure provides the potential to reduce tow vehicle horsepower requirements in soft/loose soils as a result of the increased traction and reduced sinking of the endless track in these types of soils.

According to still a further aspect of the present disclosure, the track system of the present disclosure can increase productivity by reducing time required to navigate the implement across roads and through field entrances.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings:

FIG. 7 is an isometric view of a knuckle of the main carrier of FIG. 6;

FIG. 8 is an isometric view of a carrier of the main carrier of FIG. 6;

FIG. 9 is an isometric view of a front support of the main carrier of FIG. 6;

FIG. 10 is an isometric view of a rear support of the main carrier of FIG. 6;

FIG. 12 is a cross-sectional view along line 12-12 of FIG. 11;

FIG. 13 is a cross-sectional view along line 13-13 of FIG. 11;

DETAILED DESCRIPTION OF THE INVENTION

Figure 1:
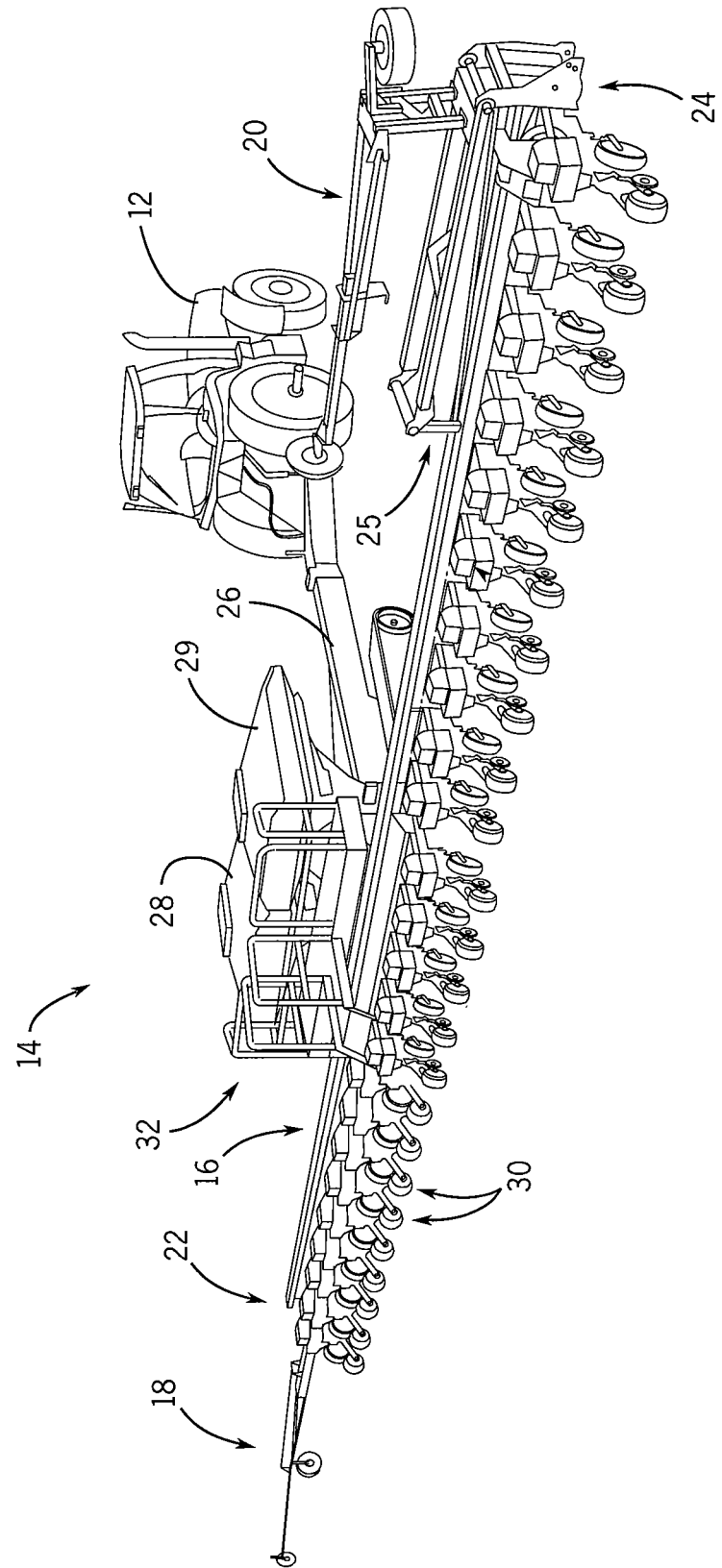
FIG. 1 is a rear isometric view of a planter having a motive track system according to one aspect of the disclosure.

Referring now to the drawings, and more particularly to FIG. 1, there is shown an agricultural work system 10 that includes an agricultural work vehicle, such as tractor (not shown) that tows and optionally supplies operating power to an agricultural implement 14, which is depicted as a multi-row front fold planter, but can be any suitable implement. Planter 14 can include a toolbar 16 with left and right marker assemblies 18, 20 that are attached to left and right ends 22, 24 of toolbar 16, respectively. Supports 25 can support marker assemblies 18, 20 when in a folded position.

Planter 14 can include other elements such as drawbar 26 for connection to the tractor, large seed hoppers 28, 29 which provide seeds to row or seed units 30, and platform and gate assembly 32 for accessing and filling large seed hoppers 28, 29. Row or planting units 30 can include a variety of elements for dispensing seed, fertilizer, pesticide, herbicide and other agricultural materials. Such elements can include, but are not limited to, a furrow opening apparatus; gage wheels; a pair of lateral spaced, or staggered, furrow opener discs, or alternatively, and without detracting or departing from the spirit and scope of the present invention, a runner opener type for providing a furrow in the ground; a pair of furrow closer discs, a seed meter, a press wheel arranged in fore-and-aft relationship relative to each other; and a agricultural chemical hopper. Additionally planter 14 can have planting units 30 with individual seed boxes in addition to the large seed hoppers 28, 29.

Figure 2:
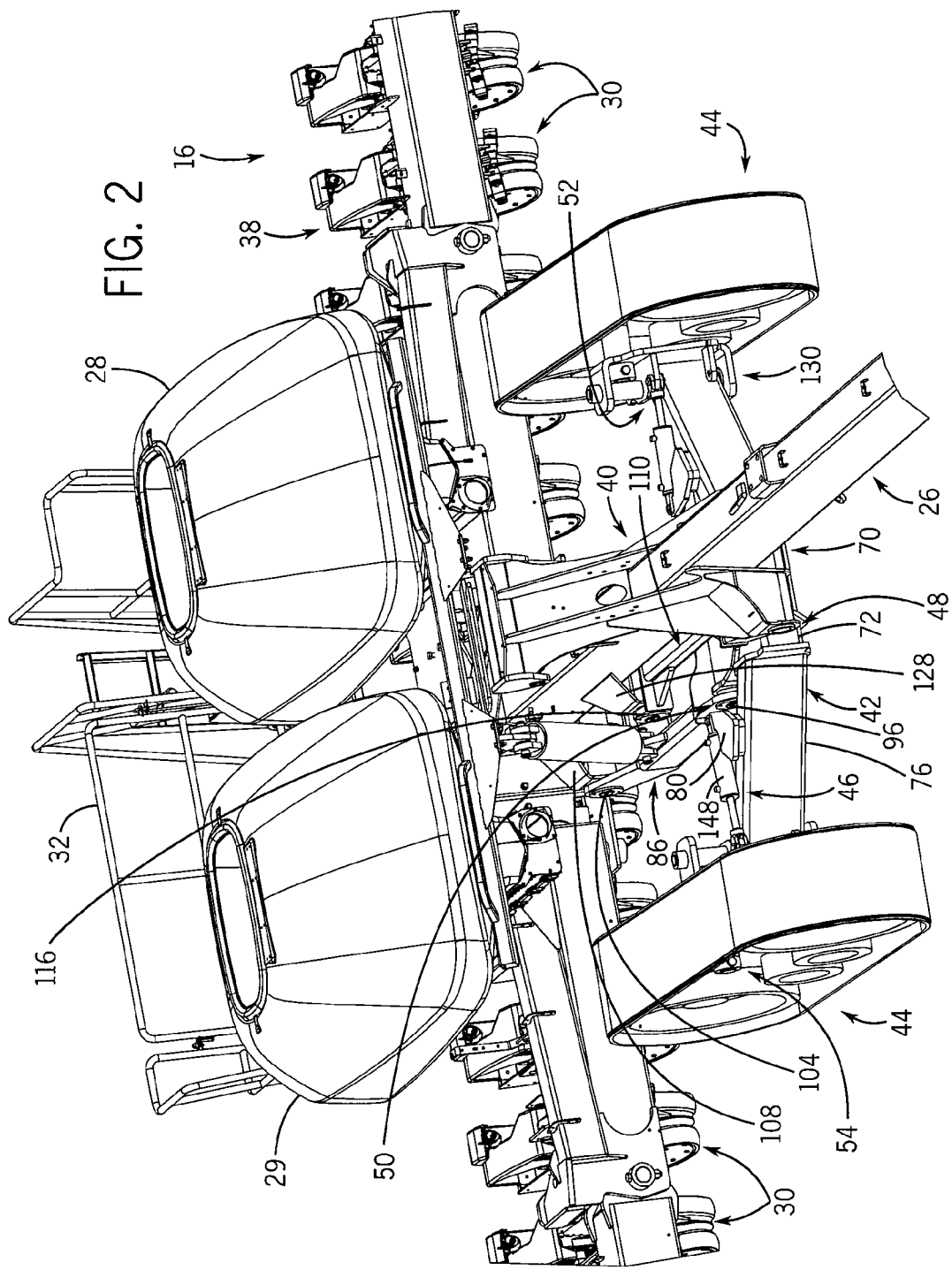
FIG. 2 is a partial front isometric view of the planter shown in FIG. 1.
Figure 3:
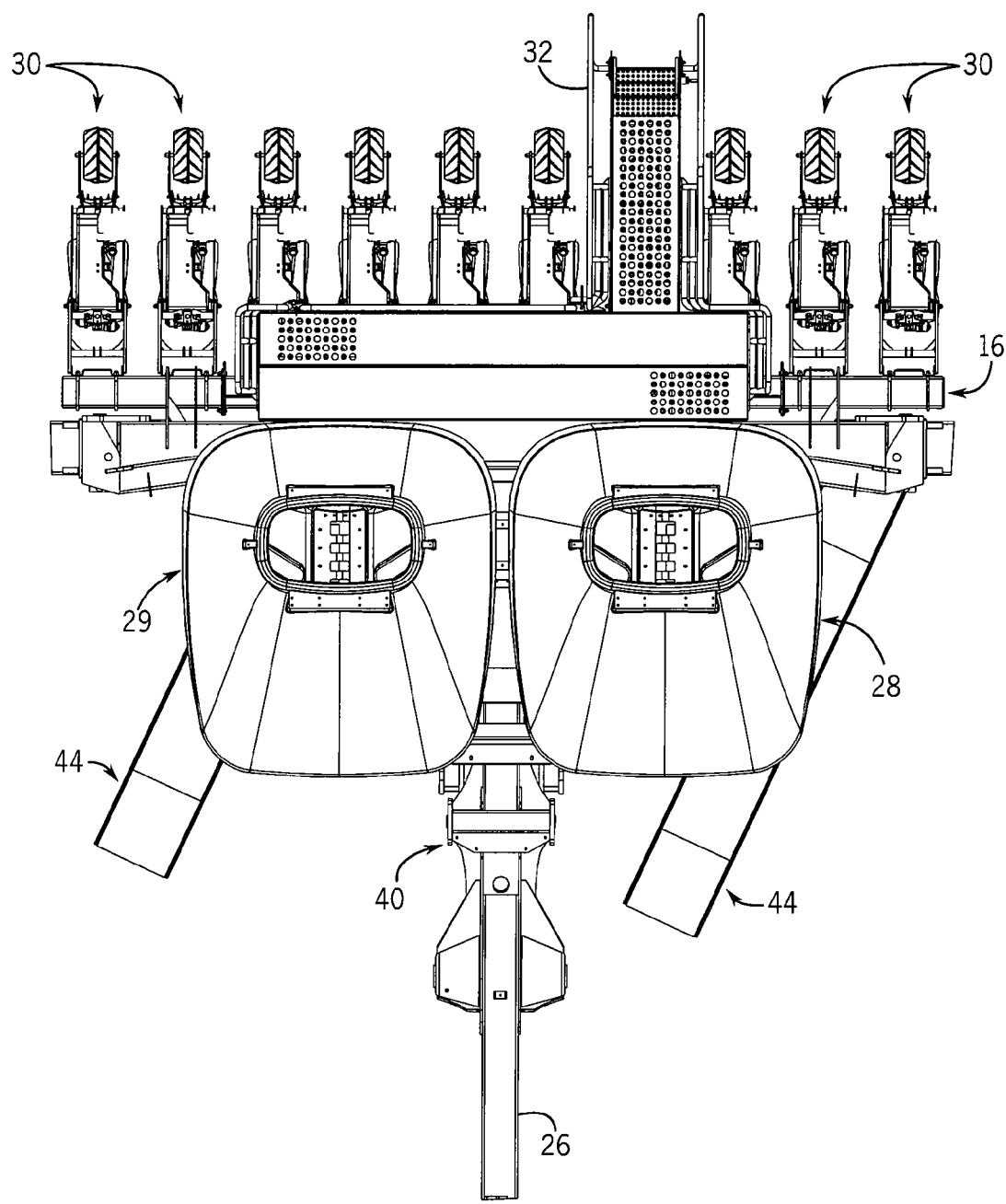
FIG. 3 is a partially broken away, top plan view of planter of FIG. 1 in a transport steering position.
Figure 4:
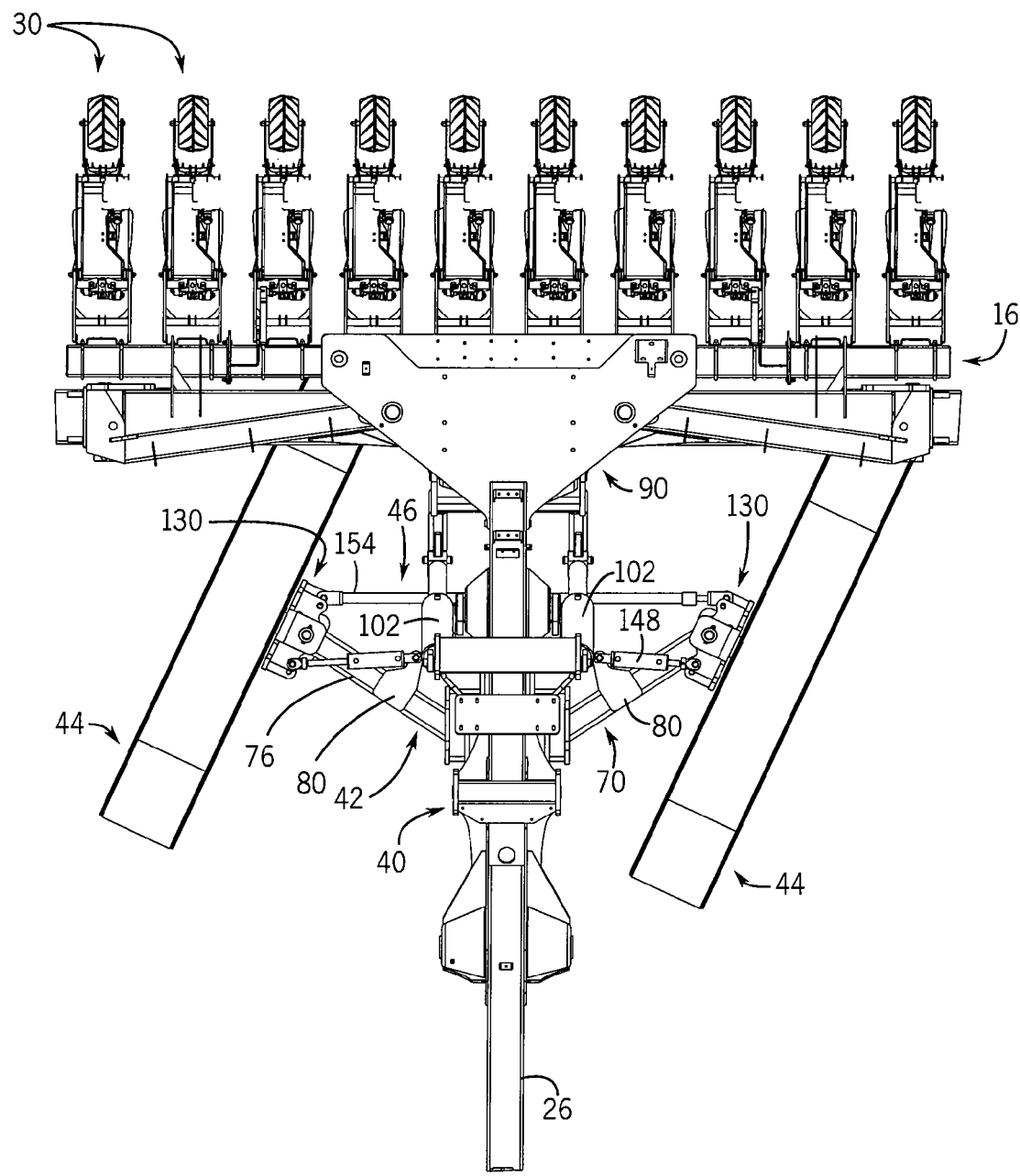
FIG. 4 is a partially broken away, top plan view of a main carrier of FIG. 3 in a transport steering position.
Figure 5:
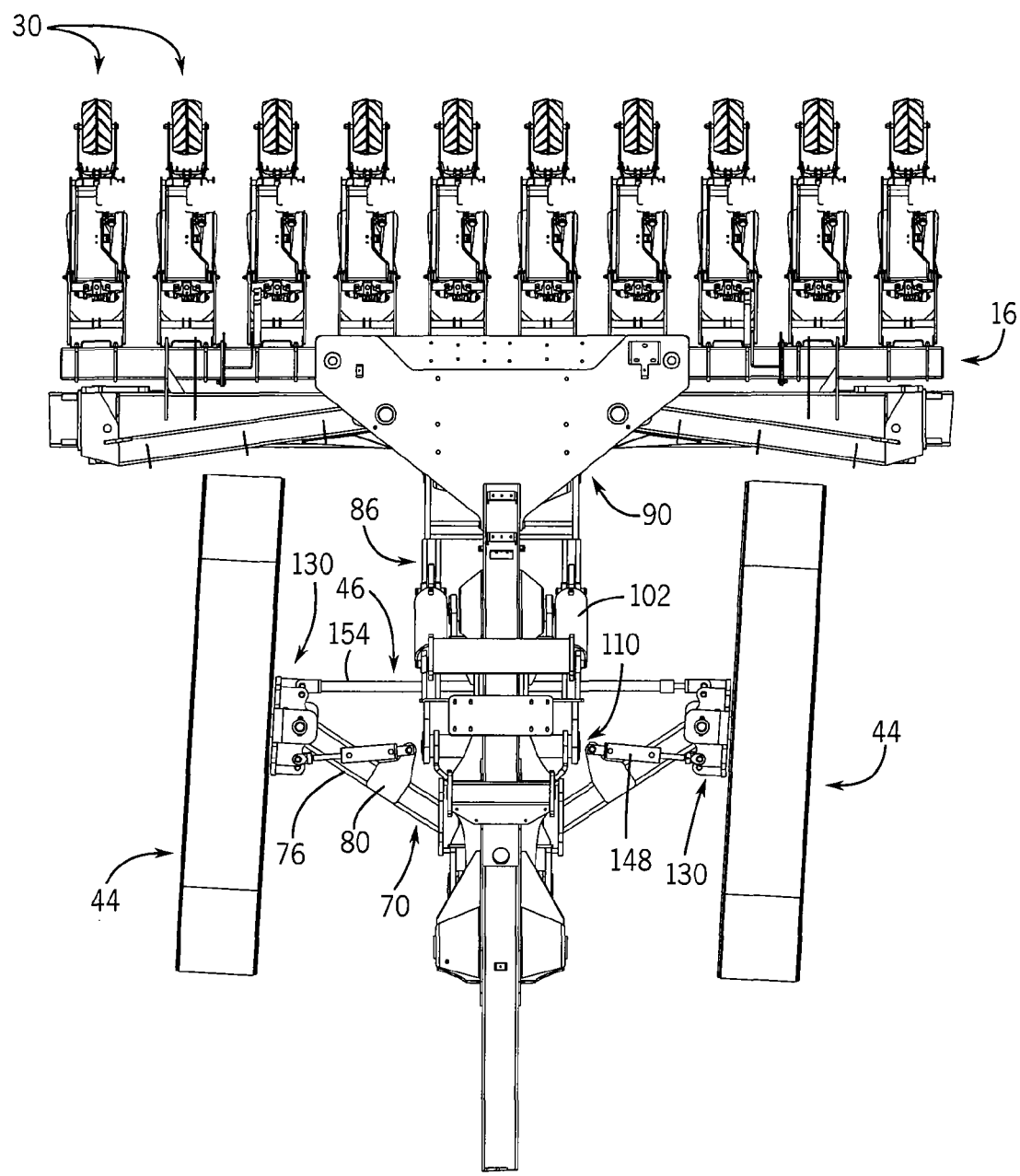
FIG. 5 is a partially broken away, top plan view of a main carrier of FIG. 3 in a field steering position.

As noted above, the planter 14 has a pair of bulk fill hoppers 28,29. Bulk fill hopper 28 holds seed for the seed units 30 mounted to the left wing of frame 16 and bulk fill hopper 29 holds seed for the seed units 30 mounted to the right wing of frame 16. As shown in FIG. 2, the seed units 30 are flow coupled to its bulk fill hopper by supply hoses (not shown). Seed is metered from the bulk fill hopper 28 to the hoses by a seed metering assembly (not shown), as known in the art. Each seed unit 30 has a seed mini hopper 38 and the seed is delivered from the bulk fill hopper to the individual seed boxes 38.

Looking now at FIGS. 2-5, the planter 14 includes a outer hitch 40 to which the draw bar 26 is attached, and which supports the bulk fill hoppers 28,29, as well as the platform and gate assembly 32. Below the hoppers 28,29, the outer hitch 40 is attached to a main carrier 42. The main carrier 42 includes a pair of endless track assemblies 44 connected to opposite sides of the main carrier 42. The track assemblies 44 are also operably connected to a steering system 46 that is disposed in part on the main carrier 42 and that is operably connected to the tractor in a known manner, such as by a suitable power take-off, hydraulic member, and/or electronic control system that can be wired or wireless (not shown), in order to operate the steering system 46 to steer the track assemblies 44 and enable the operator of the tractor to control the direction of travel of the track assemblies 44, and consequently the planter 14.

The connection of the track assemblies 44 to the main carrier 42 and to the steering system 46, as well as the connection of the steering system 46 to the main carrier 42 and the connection of the main carrier 42 to the outer hitch 40 provides the implement 14 with the ability to steer the track assemblies 44 in both the field and road transport operational modes for the implement 14. Further, these connections provide the implement 14 with the ability to keep the track assemblies 44 following the ground contour throughout the range of motion change of the main carrier 42.

Figure 15:
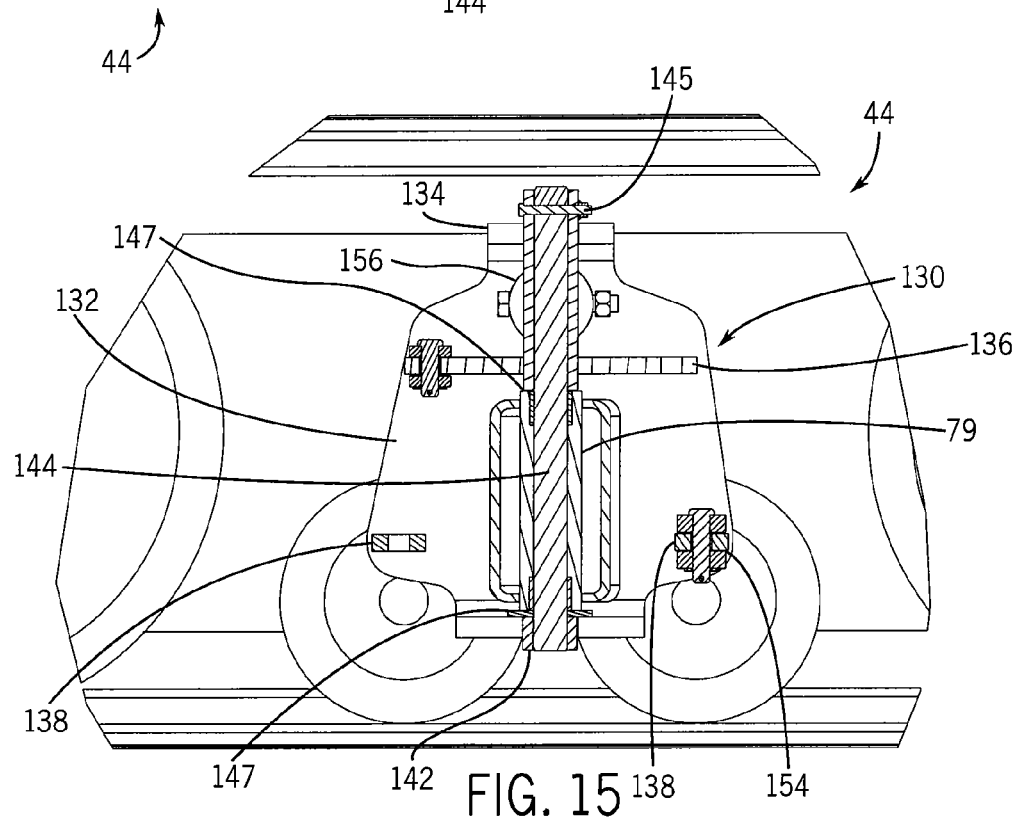
FIG. 15 is a cross-sectional view along line 15-15 of FIG. 14.

Looking now at FIGS. 6-13, the main carrier 42 is shown without the outer hitch 40 and in an elevated, transport position. The main carrier 42 includes a carrier 70 (FIG. 8) having a central portion 72 with a pivot sleeve 74 positioned at a front end 75 thereof, and a pair of outwardly extending angled arms 76 on opposed sides of the central portion 72. Each arm 76 includes a pair of aligned apertures 78 opposite the central portion 72, optionally with a channel 79 extending therebetween (FIG. 15), and a flange 80 secured to the arm 76 between the apertures 78 and the central portion 72. The central portion 72 also includes a rear end 82 including aligned openings 84 therein.

The rear end 82 of the carrier 70 is secured to a rear support 86, shown in FIGS. 6 and 10, 11 and 13. The rear support is generally rectangular in configuration with a pair of outwardly extending flanges 88 at both the front edge 90 and the rear edge 92 of the rear support 86. Each of the flanges 88 includes an opening 94 therein. The openings 94 in the flanges 88 on the front edge 90 are aligned with the openings 84 in the rear end 82 of the central portion 72 of the carrier 70 to receive a pivot pin 96 therein that is secured by retaining rings 97 to pivotably secure the rear support 86 to the carrier 70.

The sides of the rear support 86 each include a tab 98 extending outwardly from the rear support 86 and including an aperture 100 therein. The tabs 98 each have a hydraulic cylinder 102 pivotably secured at one end to the tabs 98, with the opposite end secured in a pivoting fashion to the outer hitch 40. The flanges 88 on the rear edge 92 of the rear support 86 also are pivotably secured to the outer hitch 40 similarly to the connection made by the pin 96 by a pin 104 positioned within the openings 94 in the flanges 88 and held therein by retention rings 106. The pin 104 is also pivotably engaged with the outer hitch 40 in a suitable manner, such as by being inserted though flanges 108 connected to the outer hitch 40, as shown in FIG. 2.

Looking now at FIGS. 6, 9, 11 and 12, the carrier 70 is connected opposite the rear support 86 to a front support 110. The front support 110 includes a main body 112 including a pair of outwardly extending front flanges 114 at one end and a pair of outwardly extending rear flanges 116 at the opposite end. The flanges 114 and 116 each include openings 118 therein, with the openings 118 in the front flanges 114 positioned in alignment with the pivot sleeve 74 to receive a pivot pin 120 therethrough that is held therein by retaining rings 122.

Opposite the pivot pin 120, the rear flanges 116 have a pivot pin 124 inserted through the openings 118 and held therein by retaining rings 126. The pin 124 can be engaged with outer hitch 40 between flanges 128 (FIG. 2) extending outwardly from the outer hitch 40 to pivotably secure the front support 110 to the outer hitch 40.

Looking now at FIGS. 2, 6, 7 and 14-15, to secure the track assemblies 44 to the main carrier 42, the carrier 70 includes a pair of knuckles 130 connected to the ends of the arms 76 opposite the central portion 72. Each knuckle 130 includes a main plate 132 with a pair of perpendicular end tabs 134 located at opposite ends of the main plate 132. Each knuckle 130 also includes a first intermediate tab 136 and a pair of second intermediate tabs 138 extending perpendicularly from the main plate 132. The end tabs 134 each include an aperture 140 therein. The aperture 140 in the upper end tab 134 receives a sleeve 142 therein that extends between the end tab 134 and an aligned aperture 141 in the first intermediate tab 136 The passage defined by the sleeve 142 is aligned with the aperture 140 in the lower end tab 134, which can also include a similar sleeve 142. Thus, when the arm 76 is positioned between the first intermediate tab 136 and the lower end tab 134, the apertures 78 in the arm 76 are positioned in alignment with the sleeve 142 to enable a pivot pin 144 to be inserted therethrough to connect the knuckle 130 to the arm 76. The pin 144 is affixed to the sleeve 142, such as by a locking pin 145 inserted through the sleeve 142 to engage the pivot pin 144, but allows the arm 76 to rotate with respect to the pivot pin 144. The pivot pin 144 also can be engaged with one or more wear rings 147 located between the pivot pin 144/sleeve 142 and the upper end of the arm 76 or channel 79 extending through the arm 76, as well as between the sleeve 142/pivot pin 144 and the lower end of the arm 76 or channel 79 to prevent the movement of the pivot pin 144 from compromising the integrity of the material forming the arm 76 and/or channel 79 over time. The wear rings 147 can also be utilized on all other pivot pins in the main carrier 42 to provide the same function.

The first intermediate tab 136 also includes a pair of smaller openings 146 therein that are spaced from the aperture 141. These openings 146 are used to pivotally connect one end of an hydraulic cylinder 148 to the knuckle 130 via the first intermediate tab 136. The opposed end of the cylinder 148 is pivotally connected to a similar opening 150 form in the flanges 80 extending outwardly from the arms 76.

The second intermediate tabs 138 also include an opening 152 formed therein. These openings 152 are used to pivotally connect a tie rod 154 between one of the second intermediate tabs 138 disposed on each knuckle 130 to enable the knuckles 130 to move in conjunction with one another. Further, in the illustrated embodiment the knuckles 130 and the tabs 134, 136 and 138 thereon are formed to be symmetrical such that the knuckles 130 can be effectively used in either orientation on either side of the main carrier 42.

Opposite the tabs 134, 136 and 138, the knuckle 130 also includes a sleeve 156 extending outwardly from the main plate 132 at a location between the upper end tab 134 and the first intermediate tab 136. The sleeve 156 retains a shaft 157 therein via a pin 159, the shaft 157 extending through the main plate 132 and the sleeve 156 and outwardly into pivoting engagement with the adjacent track assembly 44. The shaft 157 is retained in engagement with the track assembly 44 opposite the sleeve 156 by a collar 158 engaged with the sleeve 157 using pin 161 opposite the main plate 132 in order to enable the track assembly 44 to rotate around the shaft 157 between the collar 158 and the sleeve 156.

With this construction for the main carrier 42, the track assemblies 44 can remain parallel to the ground over which the implement 14 travels throughout the range of motion of the main carrier 42. In addition, the steering system 46 can remain attached to the track assemblies 44 as well as to the main carrier 42.

In the illustrated embodiment, this is accomplished by using the pivoting connections 48, 50, 52 and 54 formed between the various components of the main carrier 42 and the outer hitch 40, the main carrier 42 and the steering system 46, the steering system 46 and the track assemblies 44, and the track assemblies 44 to the main carrier 42, respectively.

Figure 6:
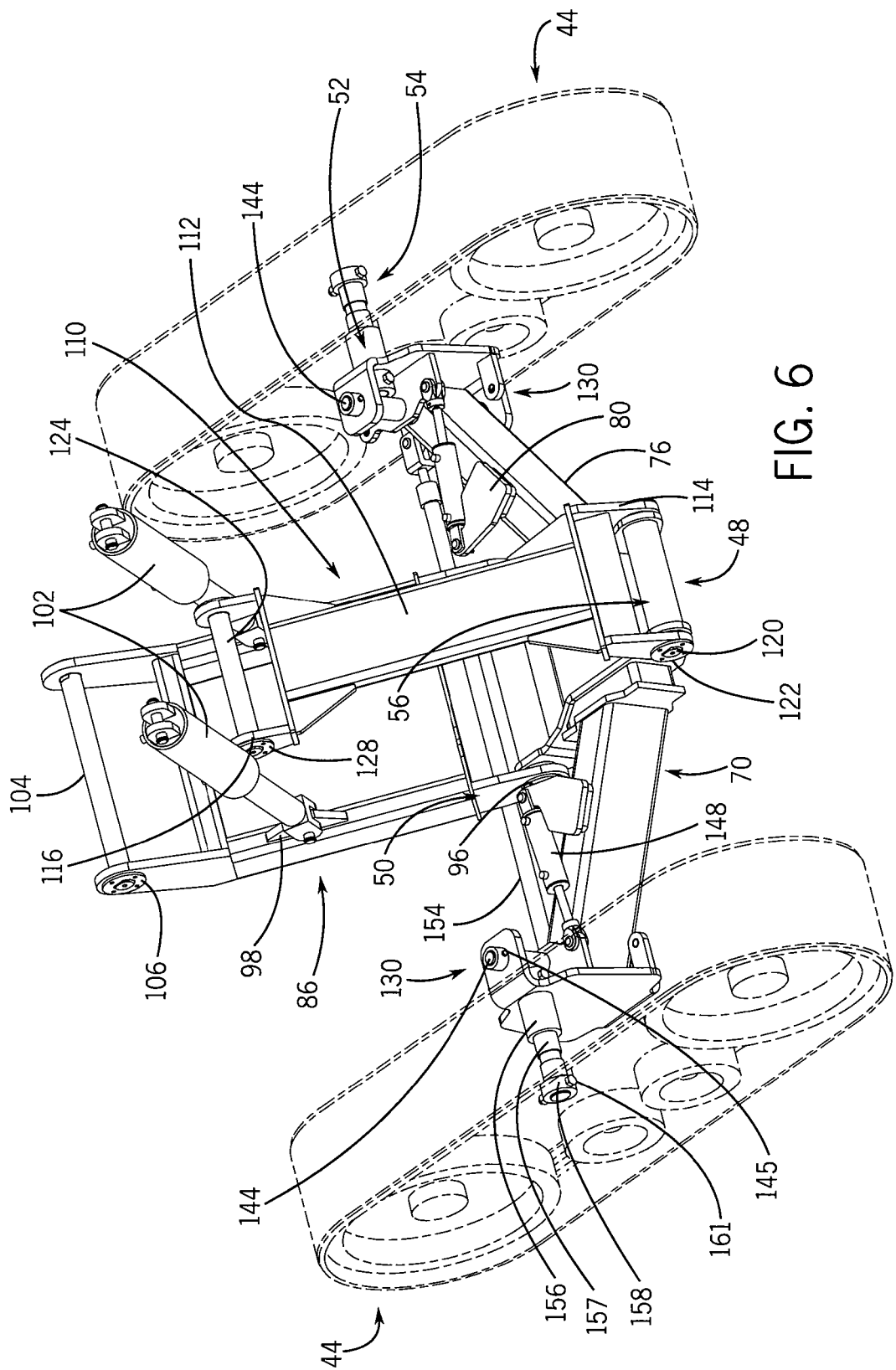
FIG. 6 is an isometric view of the main carrier of FIG. 4 in an elevated transport position.
Figure 11:
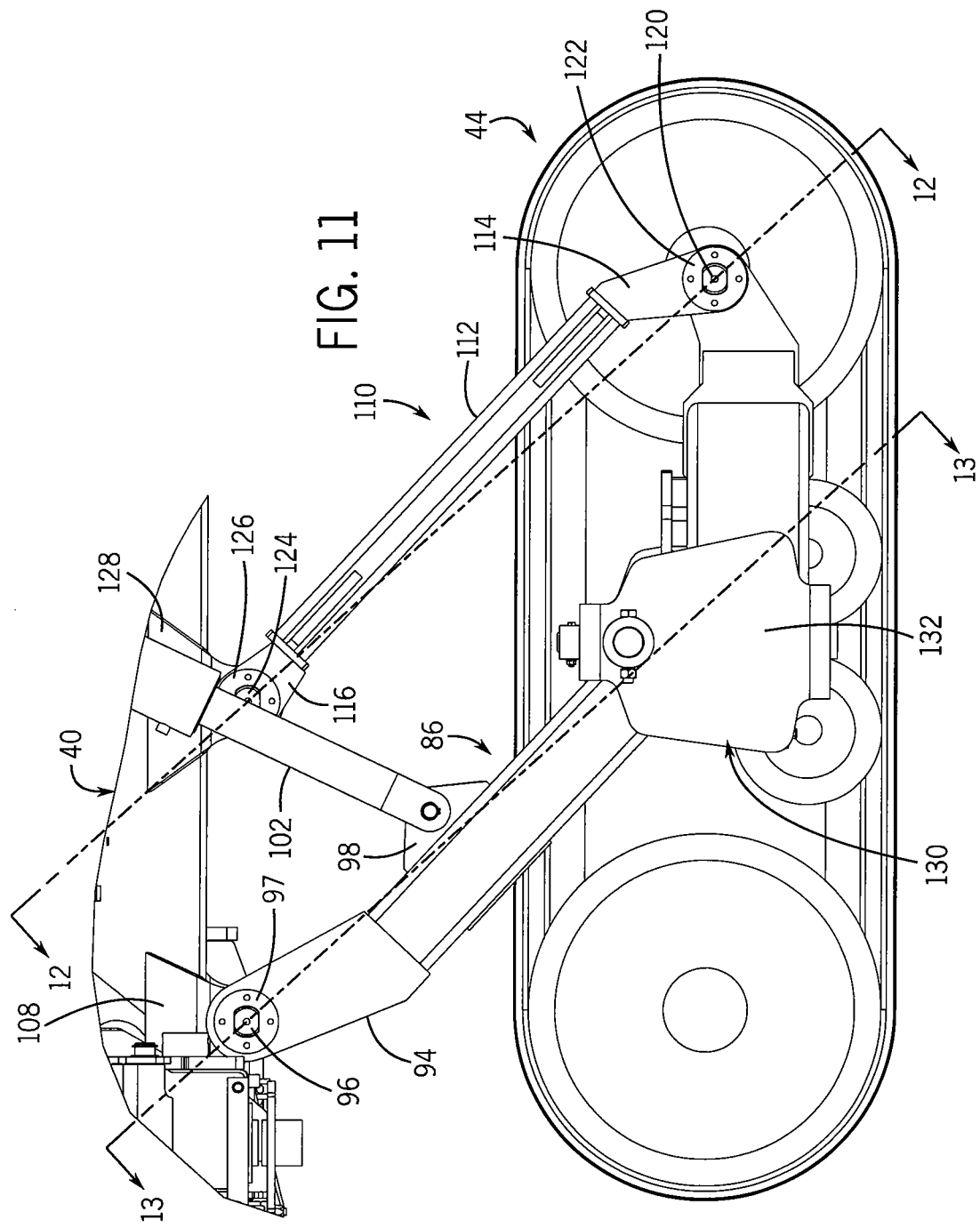
FIG. 11 is a partial interior side elevation view of the main carrier of FIG. 6.
Figure 14:
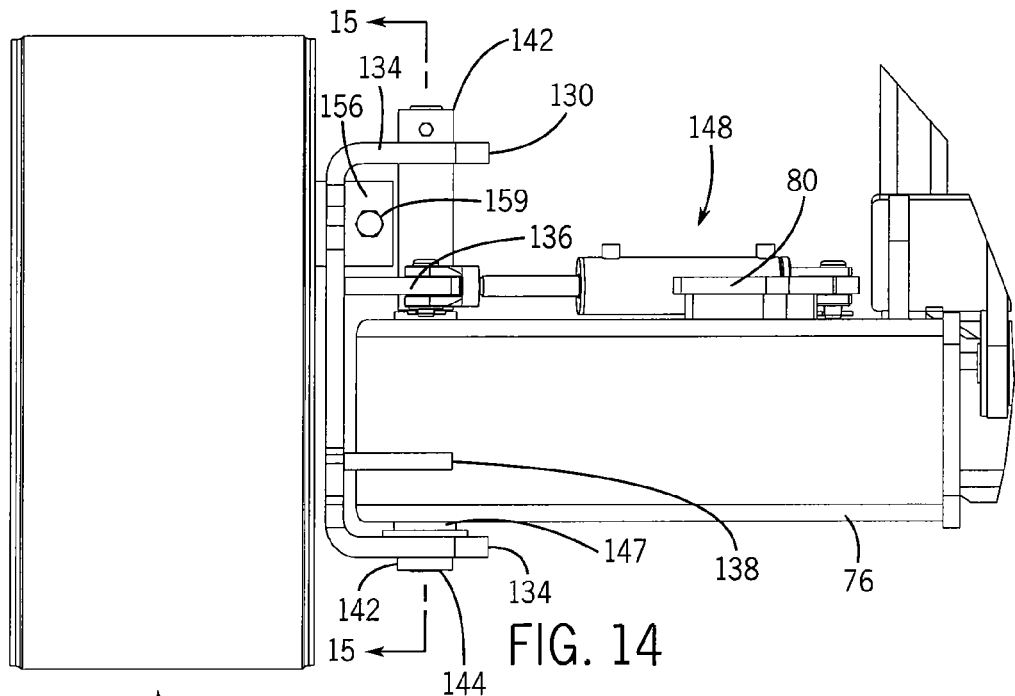
FIG. 14 is a partial front elevation view of the main carrier of FIG. 6.

In the illustrated embodiment, the first pivoting connection 48 enables the main carrier 42 to pivot with regard to the outer hitch 40, as best shown in FIGS. 2, 6, 11 and 12 and is the base reaction joint for all other events is formed between the main carrier 42 and the outer hitch 40. The first pivoting connection 48 is a single pin pivot joint 56 formed by the pivoting connection between the front flanges 114 of the front support 110 and the sleeve 74 on the carrier 70 to the outer hitch 40 made by the pivot pin 120 connecting, which is engaged with the outer hitch 40 via flanges 116 (FIGS. 2, 6 and 9).

The second pivoting connection 50 connects the main carrier 42 and the steering system 46 to the outer hitch 40. This second pivoting connection 50 ensures the main carriage 42 and steering system 46 remain aligned with the track assemblies 44 and the outer hitch 40 while allowing the main carrier 42 to move through required range of travel between the field (FIG. 2) and transport (FIG. 6) modes. As shown in the illustrated embodiment, this second pivoting connection 50 is formed by the pivot pin 104 engaged between flanges 88 on the rear edge 92 of the rear support 86 and the aligned sleeve 108 on the outer hitch 40 and the pivot pin 124 engaged between the rear flanges 116 on the front support 110 and the sleeve 128 on the outer hitch 40 to pivotally secure the main carrier 42 to the main frame 40 at a point rearward of the first pivoting connection 48.

In addition, the second connection 50 is facilitated by the connection of the one end of each of hydraulic cylinder 102 to the main carriage 42 at tabs 98. The opposite end of the cylinders 102 are secured in a pivoting manner to the outer hitch 40 and can be operated to pivot the main carriage 42 with respect to the outer hitch 40 between the field and transport positions. These cylinders 102 form an external link tied directly from the steering assembly 46 to the outer hitch 40 that regulates the control angle of the steering assembly 46 based upon relative position between the main carrier 42 and the outer hitch 40.

The third pivoting connection 52 is formed between each end of the steering system 46 and each of the endless track assemblies 44 by pivot pin 144 connecting the knuckle 130 to the arm 76, the pivoting connection of the hydraulic cylinder 148 to the knuckle 130 and corresponding flanges 80 on the adjacent arm 76, and the connection of the tie rod 154 between each knuckle 130, which, in part, form the steering system 46. Further, while two cylinders 148 are shown in the illustrated embodiment, one cylinder 148 or a number of cylinders 148 greater than two (2) can also be utilized in the steering system 46. In this configuration, the third connection 52 allows the track assemblies 44 to be turned by the steering system 46 to rotate the track assemblies 44 with respect to the main carriage 42. This third pivoting connection 52 also functions to maintain the steering system 46 predominantly perpendicular to the ground travel path of the implement 14, while also maintaining the steering system 46 predominantly perpendicular to the outer hitch 40. This allows the steering system 46 to be operated by an electronic control unit or remote control switch (not shown) in the tractor that is operably connected to the cylinders 148 to "turn" the track assemblies 44 such that the turning motion of the track assemblies 44 has the track assemblies 44 rotating parallel to the ground. As a result, the third pivoting connection 52 prevents the rotational motion of the track assemblies 44 imparted by the steering system 46 from causing an angular displacement of the track assemblies 44 which would result in a steering arc.

Because the track assemblies 44 are nested close to the main carriage 42, the range of motion of the track assemblies 44 is controlled via feedback from sensors (not shown) disposed on the various portions of the main carriage 42 and the on-board electronic control module in a known manner to avoid contact of the track assemblies 44 with the main carriage 42. While the range of rotation of the track assemblies 44 in responses to the actuation of the steering system 46 can be selected as desired, depending on the embodiment, the steering system 46 would allow for a maximum of ±40, ±30, or ±25 degrees of rotation of the track assemblies 44, among other ranges, in the road transport position and be software-restricted to a lesser degree of rotation of the track assemblies 44 in the field mode or position, such as ±20, ±15, or ±10 degree rotations, for example.

The fourth pivoting connection 54 is formed within the track assemblies 44 or between the assemblies 44 and the main carriage 42 to provide for independent articulation of each track assembly 44 relative to the main carriage 42 to ensure the track assemblies 44 will follow the contour of the ground on which they travel, optionally independently of one another. Typically, the articulation provided by the fourth pivoting connection 54 is mechanically restricted to ensure excessive travel of the track assemblies 44 relative to the main carriage 42 is not encountered that could result in vehicle interference. The electronic control module (ECU) and multiple sensors can be employed on the implement 14 on one or more of the main carriage 42, the steering system 46 and the endless track assemblies 44 for provide positioning feedback, vehicle speed, and other sensible parameters so that proper user control of the steering system 46 can be achieved. This function can also be obtained by using mechanical stops (not shown) that restrict travel of the movement of one or more of the main carriage 42, the track assemblies 44 and/or the steering system 46 in both directions.

In the illustrated embodiment, the fourth pivoting connection 54 is formed by the shaft 157 extending outwardly from each knuckle 130 into pivoting engagement with the adjacent track assembly 44 in order to enable the track assembly 44 to rotate around the shaft 157. In this configuration, the track assemblies 44 can each conform independently to the contour of the ground over which the main carriage 42 is traveling without affecting the configuration of the other track assembly 44.

The invention has been described with respect to delivering seed to a series of seed units. It is understood however that the invention may also be used to deliver other particulate matter, such as granular herbicide, granular fertilizer, or other granular chemicals to a series of dispensing units.

Many changes and modifications could be made to the invention without departing from the spirit thereof. The scope of these changes will become apparent from the appended claims.

We claim:

1. An agricultural implement having a steering mechanism comprising:
   a) an outer hitch adapted to be operably connected to a tractor;
   b) a main carriage having a carrier and a rear support pivotably connected thereto, the rear support interconnected to the outer hitch by a first pivoting connection such that the main carriage is pivotable about a horizontal axis;
   c) a steering system connected to the carrier of the main carriage by a second pivoting connection such that the steering system is pivotable about a first vertical axis; and
   d) at least one endless track assembly connected to the steering system by a third pivoting connection configured to maintain the steering system perpendicular to a ground travel path of the implement and generally perpendicular to the outer hitch, the at least one endless track pivotable about a second vertical axis; and
   e) a fourth pivoting connection pivotably connecting the carrier to the at least one endless track assembly, the fourth pivoting connection configured to provide independent articulation of the least one endless tract assembly relative to the main carriage.

2. The implement of claim 1 wherein the first pivoting connection includes at least on hydraulic cylinder operably connected between the rear support and the outer hitch.

3. The implement of claim 1 wherein the at least one track assembly is restricted to a maximum of ±25 degrees rotation in a transport mode of the implement.

4. The implement of claim 1 wherein the at least one track assembly is restricted to a maximum of ±10 degrees rotation in a field mode of the implement.

5. The implement of claim 1 wherein the implement includes two endless track assemblies and each assembly is connected to the carrier of the main carriage by a second, fourth pivoting connection and to the steering system by a second, third pivoting connection.

6. The implement of claim 5 wherein the steering system comprises at least one hydraulic cylinder attached between the carrier of the main carriage and the at least one track assembly.

7. The implement of claim 5 wherein the steering system includes a tie bar connected between the two endless track assemblies.

8. The implement of claim 1 further comprising a front support pivotably connected to the carrier of the main carriage.

9. The implement of claim 1 wherein the fourth pivoting connection is formed by a knuckle operatively connect to the carrier of the main carriage and pivotally attached to the at least one track assembly.

10. The implement of claim 9 wherein the third pivoting connection is defined by the steering system pivotably connected to the knuckle.

* * * * *